United States Patent
Thomason

[11] 3,880,757
[45] Apr. 29, 1975

[54] FILTERING SYSTEM

[76] Inventor: Gary Thomason, 13530 S.W. Aragon St., Beaverton, Oreg. 97005

[22] Filed: Apr. 16, 1973

[21] Appl. No.: 351,588

Related U.S. Application Data

[63] Continuation-in-part of Ser. No. 178,736, Sept. 8, 1971, Pat. No. 3,759,388.

[52] U.S. Cl. .............. 210/167; 210/236; 210/443; 210/445
[51] Int. Cl. ........................................... B01d 27/08
[58] Field of Search .......... 210/167, 443, 439, 453, 210/440, 454, 445, 438, 437, 444.3, 450, DIG. 17, 497.1, 236–238

[56] References Cited
UNITED STATES PATENTS

| | | | |
|---|---|---|---|
| 651,423 | 6/1900 | Miner | 210/443 |
| 2,110,009 | 3/1938 | Weidenbacker | 210/440 |
| 3,044,475 | 7/1962 | Thompson | 210/DIG. 17 |
| 3,105,042 | 9/1963 | Roosa | 210/445 X |
| 3,481,478 | 12/1969 | Williams | 210/139 |
| 3,504,803 | 4/1970 | Brayman | 210/439 |
| 3,624,779 | 11/1971 | Miller | 210/497.1 |
| 3,759,388 | 9/1973 | Thomason | 210/167 |

Primary Examiner—Theodore A. Granger
Attorney, Agent, or Firm—Klarquist, Sparkman, Campbell, Leigh, Hall & Whinston

[57] ABSTRACT

A filtering system for cooking vessels includes first and second stage filters and a pump therebetween. Hot cooking oil is continuously passed through a first stage filter wherein larger particles are removed, after which the oil is passed through a second stage filter wherein small particles are removed. The media in the second stage filter comprises thin, fibrous paper material presenting interlocking fibers between layers in a multilayer roll, with the hot cooking oil being pumped axially through such roll. Both the first and second stage filter media are contained within disposable cans easily exchanged but to which an oiltight connection is made.

14 Claims, 7 Drawing Figures

FILTERING SYSTEM

CROSS REFERENCE TO RELATED APPLICATION

This application is a continuation-in-part of my copending application Ser. No. 178,736, filed Sept. 8, 1971, entitled "Filtering System for Deep Fat Cooking Vessel" now U.S. Pat. No. 3,759,388.

BACKGROUND OF THE INVENTION

This invention relates to a filtering system for cooking vessels, and particularly to a filtering system for removing small particles and employing exchangeable filtering elements.

Many restaurants employ deep fat fryers wherein the heated cooking oil is maintained at a high temperature for an extended period of time in which food articles, usually having some kind of batter or coating applied thereto, are cooked in fairly large quantities in the same heated oil. When oil of this type is continuously used, foreign matter retained in the oil, e.g., some of the batter or coating applied to the food articles, will rapidly carbonize or char. These overheated materials accelerate rapid breakdown and cause hydrolysis oxidation and polymerization of the fat. Visible signs of excessive foreign matter will soon appear as, for instance, the absorbed food particles smoke or carbonize at a temperature lower than a smoke or flash point expected of the cooking oil or fat. Uneven browning of food and flavor and odor transfer occur, and the final result is the carbonizing, foaming and rancidness of the fat.

If the cooking oil in a particular vessel has been used for an entire day, it is usually necessary that the oil be filtered or replaced. This is, of course, a time consuming and also somewhat dangerous operation considering the high temperature to which the oil is usually heated. Customarily, the oil is removed from the deep fat cooking vessel and slowly passed through a filtering media such as diatomaceous earth to remove undesired particles. Unfortunately, the use of diatomaceous earth, while removing some particles, increases the content of the diatomaceous earth itself in the cooking oil. Various other straining means have been used for filtering oil removed from a cooking vessel such as conventional pleated paper cartridges, cloth bags, and the like. However, these methods do not really result in removing particles from the food as bring about the undesirable flavor qualities and rancidness of the fat, after a few days' use, because smaller particles are not removed. In general, about three days' use can be expected of a given quantity of cooking oil operated substantially continuously at high temperatures, and after such time the oil is ordinarily discarded which, of course, represents a major expense in the case of many restaurant operations.

Many attempts have been made heretofore at continuous filtering of cooking oil by continuously withdrawing cooking oil from the vat or vessel, filtering the same, and returning the same to the cooking vessel. Unfortunately, such methods have not been practical because of limited filtering accomplished. In general, pleated cartridges or the like have been employed where the cooking oil essentially passes perpendicularly through a sheet of filter material. Various strainers or similar devices have been utilized on a continuous basis in an effort to remove some foreign material from the oil. Unfortunately, none of these expedients have resulted in the removal of sufficiently fine particles from the oil to extend the life of the oil materially beyond the limits mentioned above.

In accordance with my previous application, high temperature cooking oil from the deep fat cooking vessel is passed through first and second filter stages by pumping means adapted to operate at low pressures, while continuously circulating the cooking oil from the cooking vessel through the first and second filter stages and back to the cooking vessel. The first filter stage is adapted for removing food particles down to a given size, e.g., particles of 100 microns or greater in size. The second filter stage comprises a filtering media in the form of a thin, fibrous paper material presenting interlocking fibers between layers in a multilayer roll. The hot cooking oil is passed longitudinally through the roll, i.e., substantially along the layers, through the fibers extending between layers, by means of which particles of an extremely small size are removed. According to tests, the second stage of filtering, following the first stage, removes particles of greater size than 7/100 of a micron. Removal of particles of this size acts substantially to clarify the cooking oils, and materially extends the life thereof beyond that heretofore thought possible.

In carrying out of filtering for extended periods of time, the filtering media or elements eventually become clogged, having filtered and removed a great quantity of foreign matter from the cooking oils passing therethrough. A pump bypass prevents undue pressure from building up in the system, but nevertheless it is desired that the filtering elements be replaced from time to time. For this purpose, the filtering elements are contained within cylindrical cans which are disposable and replaceable. It has been found desirable to render the replacement of these filtering elements more easily accomplished in a shorter period of time by inexperienced personnel without requiring the undue soiling of the hands or contamination of surroundings. It is also desired that a certain seal be accomplished for the flow of heated cooking oil under pressure into and out of the replaceable filtering elements and the connections attaching thereto.

SUMMARY OF THE INVENTION

According to the present invention, a filtering media is provided in a cylindrical can having upper and lower apertures therein through which a base manifold-mounted spindle may extend. The manifold, as well as the spindle, include passages for the conduction of oil to and from the media in the filter. The spindle is employed as a means engageable for not only positioning the can and coupling oil thereto, but also as means for exerting axial pressure against the can and forcing upper and lower can surfaces in secure contact with sealing members, whereby escape of oil is prevented.

In a particular embodiment, a hand-operated knob is threadably engaged to the upper portion of the spindle, and is easily operated by inexperienced personnel for presenting appreciable pressure as required by the sealing means. At the same time, the filtering elements are readily removed and replaced, and the exterior of the can does not become contaminated with oil, but is readily grasped by the individual for replacement and the installation of a new can.

Accordingly it is an object of the present invention to provide an improved filtering system for cooking oil and the like.

It is a further object of the present invention to provide an improved filtering system for cooking oil and the like wherein replaceable filter elements are employed.

It is a further object of the present invention to provide an improved filtering system employing replaceable filter elements wherein such replacement is easily accomplished by hand for making secure connection with a filtering element and without contaminating the exterior of the filtering elements whereby the same may be grasped by hand for replacement.

It is another object of the present invention to provide an improved filtering system employing replaceable filtering elements in the form of can-enclosed filter media, where the can is readily sealed and positioned by hand-operation, but may be readily removed by hand, and where the exterior of the can is essentially grease free.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
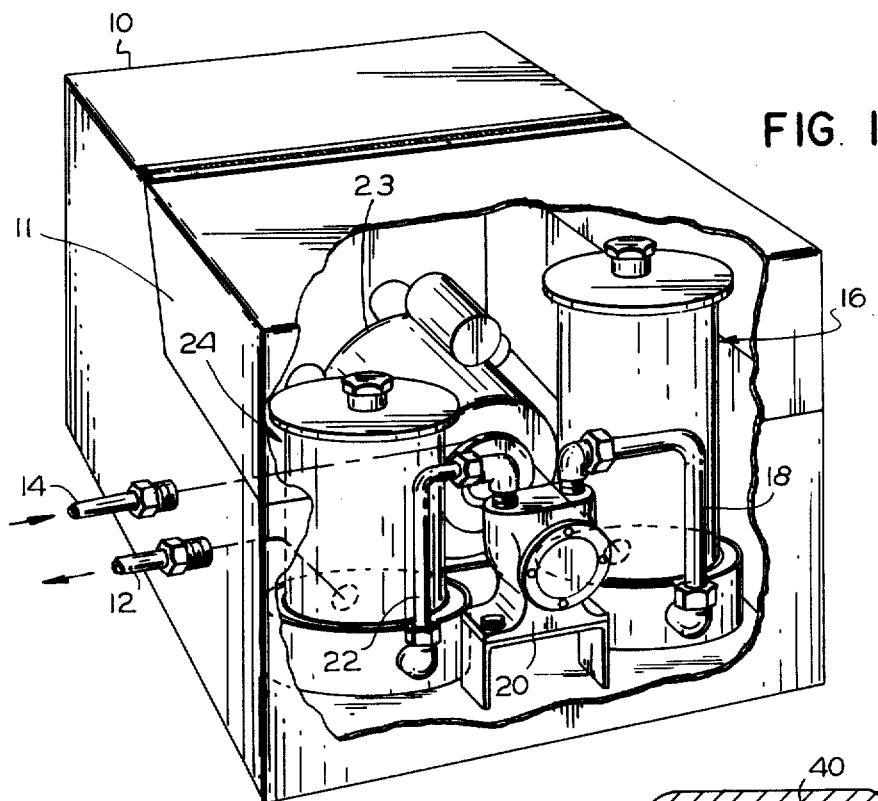
FIG. 1 is a perspective view of a filtering system according to the present invention including a cabinet therefor.

Referring to the drawings and particularly to FIG. 1, a filtering system according to the present invention is suitably housed in a cabinet 10 provided with a hinged lid 11 and pipe connections 12 and 14, the latter leading respectively to and from a heated cooking vessel or the like as employed for frying foods. The cooking oil is drawn into a first filter stage or prefilter sump 16 and from there passes via line 18 to a high temperature mechanical seal pump 20, typically operating at the speed of 1725 r.p.m. as driven by a motor 23. A suitable pump is a Model FH32 pump manufactured by Viking Pump, Cedar Falls, Iowa. This type of pump includes a bypass or pressure relief valve which suitably operates at a pressure of 25 p.s.i. whereby the pump will not provide a higher pressure. The relief valve bypasses liquid from the discharge back to the suction side of the pump for preventing the buildup of more than the desired pressure in the discharge line.

From pump 20, the oil passes through line 22 to second stage filter 24. As hereinafter more fully described, the second stage filter 24 employs a media or element for removing very fine particles and contaminants from the oil, e.g., down to 7/100 of a micron, leaving a substantially pure and renovated oil for return to the cooking vessel.

Figure 2:
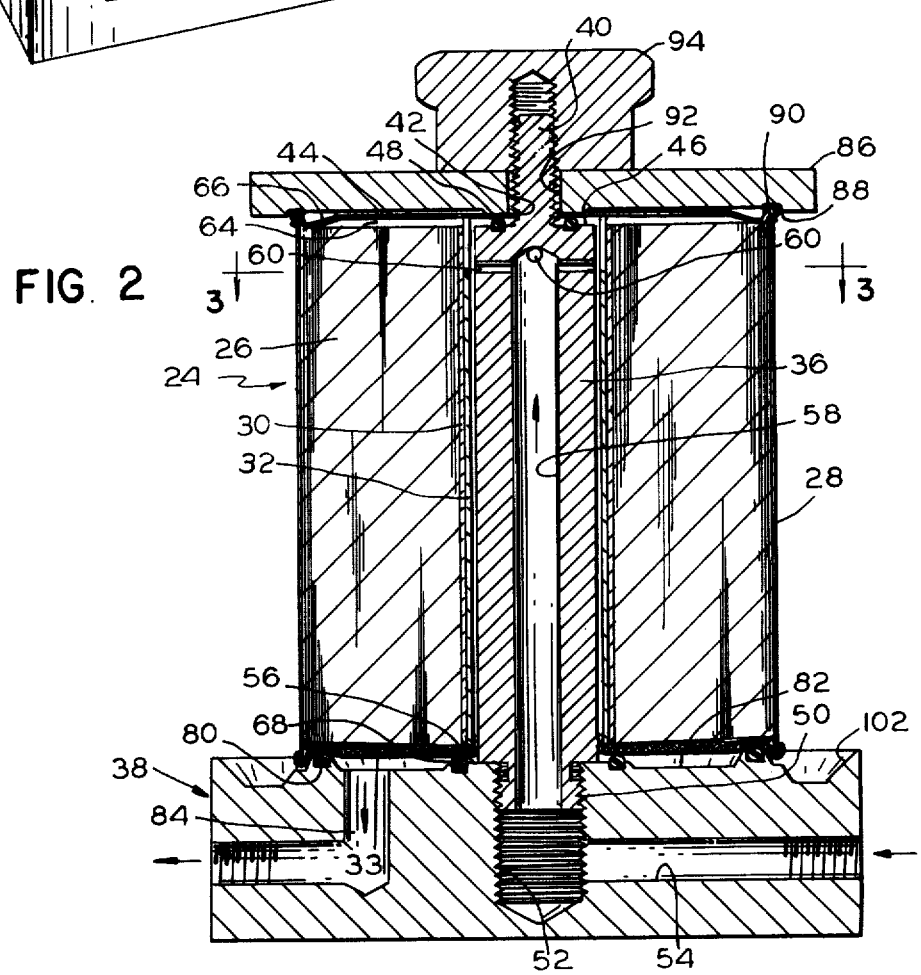
FIG. 2 is a vertical cross section of a second stage filter according to the present invention.
Figure 3:
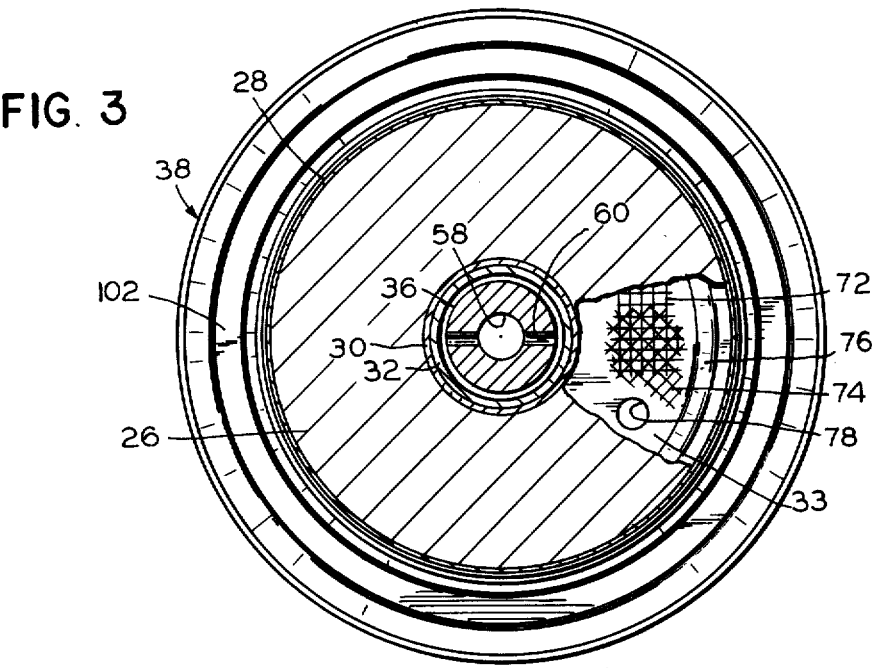
FIG. 3 is a horizontal cross section of the FIG. 2 filter taken at 3—3 in FIG. 2.
Figure 4:
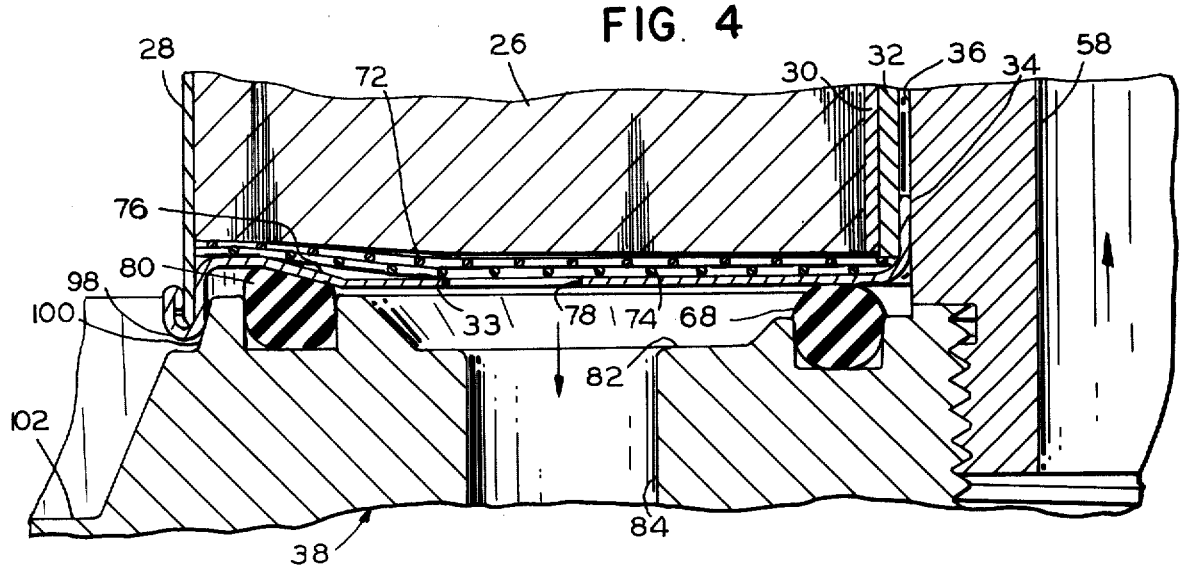
FIG. 4 is an enlarged, partially broken away, vertical cross section of the FIG. 2 filter.

The second stage filter, generally indicated at 24, is more fully illustrated in vertical cross section in FIG. 2, as well as in horizontal cross section as taken at 3—3 in FIG. 2, and in more detailed vertical cross section in FIG. 4. The filter media or element 26 is contained within cylindrical can 28 suitably formed of aluminum or tin-coated steel. The filter media or element 26 comprises a multilayer roll of thin fibrous paper material, fairly tightly wound, presenting interlocking fibers between layers in the multilayer roll. For instance, such paper may comprise soft, thin, slack-sized paper generally made from pulp having short fibers, e.g., the material may be treated in a manner for cutting fibers and/or made from hard wood. Sulphite pulp may be used. A strong caustic extraction may be employed for softening. In any case, the finished paper is preferably loose and thin having a surface with many upstanding fibers. A cardboard center tube 30 is closely received upon a cardboard core 32, the latter being fairly heavy and of substantially impervious construction and closely received within tube 30. The filter media 26 substantially completely fills the can 28 from tubes 30 and 32 to the outside cylindrical wall of the can.

The bottom 33 of can 28 is provided with a central aperture defined by an in-rolled wall 34 about which tube 32 is closely received. The aperture at 34 has an inside diameter only slightly greater than the outside diameter of a cylindrical, metal, central spindle 36 extending upwardly from manifold base 38, the latter being secured to the bottom of the cabinet. Spindle 36 extends upwardly within tube 32 for approximately the height of can 28, and at the top thereof is provided with a longitudinal, threaded portion 40 of smaller diameter than the central part of the spindle and received through aperture 42 in top 44 of can 28. The upper shoulder 46 of spindle 36 has a circular seat for receiving O-ring seal 48 which becomes depressed against the underside of top 44 as hereinafter more fully described.

Spindle 36 is provided with a second threaded portion 50 at the bottom thereof received within threaded socket 52 in manifold base 38, socket 52 communicating with radial passage 54 to which line 22 connects at the outer circumference of manifold base 38. Threaded portion 50 is threadably engaged in socket 52 for drawing spindle 36 up tight against the top surface 56 of the manifold base. The spindle 36 is further supplied with an axial passage 58 communicating with socket 52, and also communicating with radial passages 60 extending from passage 58 outwardly to the region immediately around spindle 36, between spindle 36 and core 32. Core 32 is V-notched at the top, suitably down to the location of passages 60, for enabling the flow of oil from passages 60 to region 64 under top lid 44 and immediately above media 26. The media 26 is spaced from the can top 44, as is tube 30, so oil delivered under pressure in line 22 from pump 20 will be forced into region 64, and from thence vertically downward to media 26. In order to accomplish the proper spacing to provide the aforesaid region 64, the can top 44 is beveled upwardly at 66 defining an upraised central flat region in spaced relation from media 26.

To prevent leakage of oil downwardly through the aperture at 34, the base manifold is provided with an O-ring seal 68 bearing upwardly against can bottom 33.

The oil within media 26 has a tendency to move or compact the filter media downwardly. For this reason, as well as for preventing paper migration in the oil, filter screens 72 and 74 are located at the bottom of the can just above can bottom 33. It will also be observed that the can bottom is similar in shape to the can top, having a bevel at 76, whereby the can is provided with an oil outlet region in and around screens 72 and 74. The oil then leaves can 28 through one of a plurality of apertures 78 spaced about the can bottom. The bevel 76 is also compressed against large O-ring seal 80 disposed in concentric fashion around spindle 36, and concentric with O-ring seal 68. Between these O-ring seals is located a circumferential channel well or depression 82, also concentric with the O-rings and spindle 36. Thus, the oil leaving the can through openings 78 is received within depression 82, leaving such depression via passage 84 communicating with tubular connection 12 for returning the oil to the cooking vessel.

The can 28 is compressed axially against O-ring seals 68 and 80 by means of a circular, disc-shaped cover plate 86 having a groove 88 for receiving upper can edge or rim 90 where the can top is crimped or secured to the cylindrical wall of the can. Plate 86 is centrally apertured at 92 for receiving threaded portion 40 extending upwardly from spindle 36, the threaded portion 40 being threadably engaged by knurled or indented knob 94 which may be turned by hand for exerting pressure against the top of plate 86. If so desired, knob 94 may be integral with plate 86, but in any case the knob 94 is easily turned by hand for compressing can 28 downwardly whereby the top 44 of the can makes thorough sealing connection with O-ring seal 48, and whereby the bottom 33 of the can makes thorough sealing connection with O-ring seals 80 and 68. The lower rim 98 of the can is received against beveled wall 100 of the manifold base, such beveled wall being circumferential with spindle 36 and adapted for centering the can and allowing the sealing pressue to be applied as described without distorting the can to an undesired extent. The bevel forces the lower rim slightly outwardly. Sufficient sealing pressure will generally be secured through hand turning the knob 94 before rim 98 reaches the bottom of beveled wall 100.

About the outer perimeter of manifold base 38, which is suitably circular in outline, is disposed a well 102 for catching any excess oil which may be inadvertently spilled when the filter is exchanged. When the filter is operating properly, substantially no leakage will occur into well 102, but when the filter is withdrawn upwardly, the additional peripheral catch basin is desired as a precaution, and may be easily wiped clean.

It will be readily seen that the installation and exchange of canned filters is enhanced by the construction described. The second stage filter media is substantially self-contained within a can 28 which is readily installed by inserting the same upon spindle 36, applying plate 86, and turning knob 94 with a moderate amount of torque until reasonably tight. The seals 48, 68 and 80 are engaged so that oil flowing into the filter is kept within the central region of spindle 36 by O-ring seal 68 at the lower end of the spindle, while the oil is prevented from leaking through apertures 92 by means of O-ring seal 48 at the top of the spindle. The oil is thereby directed to region 86 within the otherwise closed top 44 of the can, the oil then flowing downwardly through the filter media and exiting through apertures 78 into depression 82. The oil exiting from the filter is confined within the region of depression 82, between O-ring seals 68 and 80, whereby there is substantially no mixing of inlet oil and outlet oil, nor is leakage permitted during pressurized operation past seal 80 to the surrounding well 102. After the filtering lifetime of the second stage filter 24 is reached, the same is readily removed by first loosening and removing knob 94 and plate 86, and then by removing the can 28 from spindle 36. The can is discarded and a replacement is placed upon spindle 36 in the manner described above. Not only is changing of filters achieved in a rapid manner, but also the oil passage is well confined within can 28 without requirement of excessive or complex cartridge-engaging mechanism. Moreover, the exterior of can 28 is kept clean, whereby the same may be readily handled by cooking personnel, and whereby no objectionable layer of grease or oil is accumulated on the exterior of the equipment.

Figure 5:
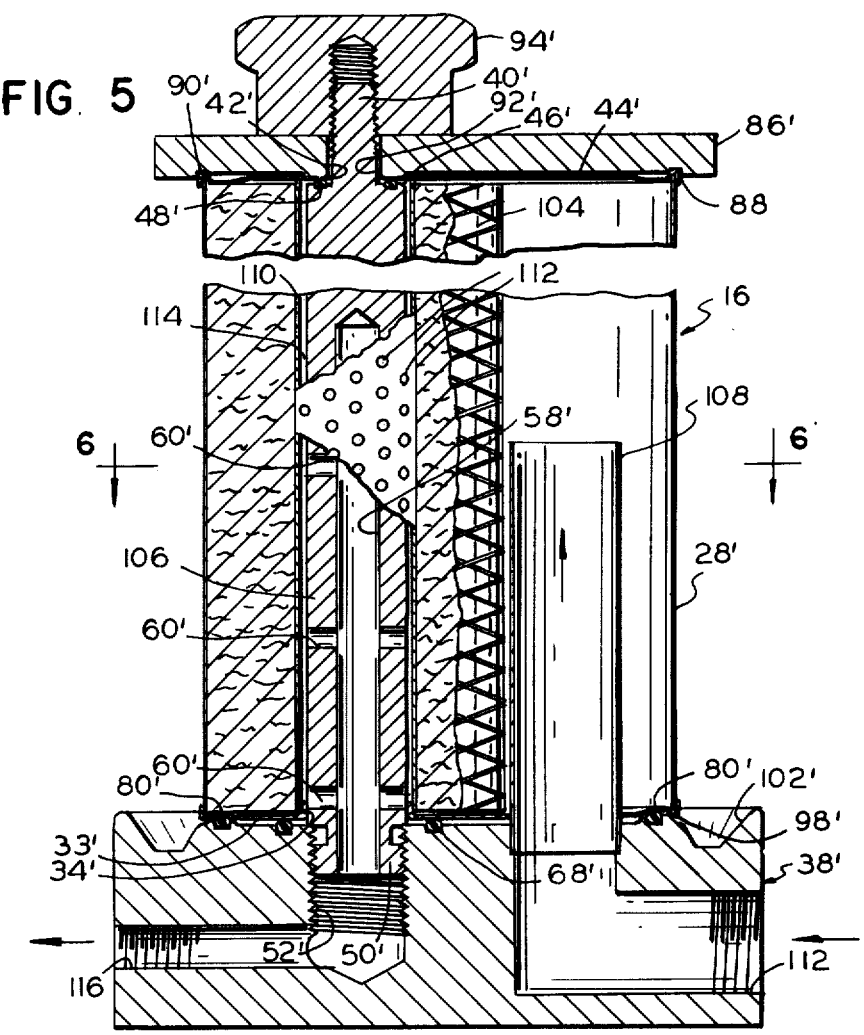
FIG. 5 is a vertical cross section of a first stage filter according to the present invention.
Figure 6:
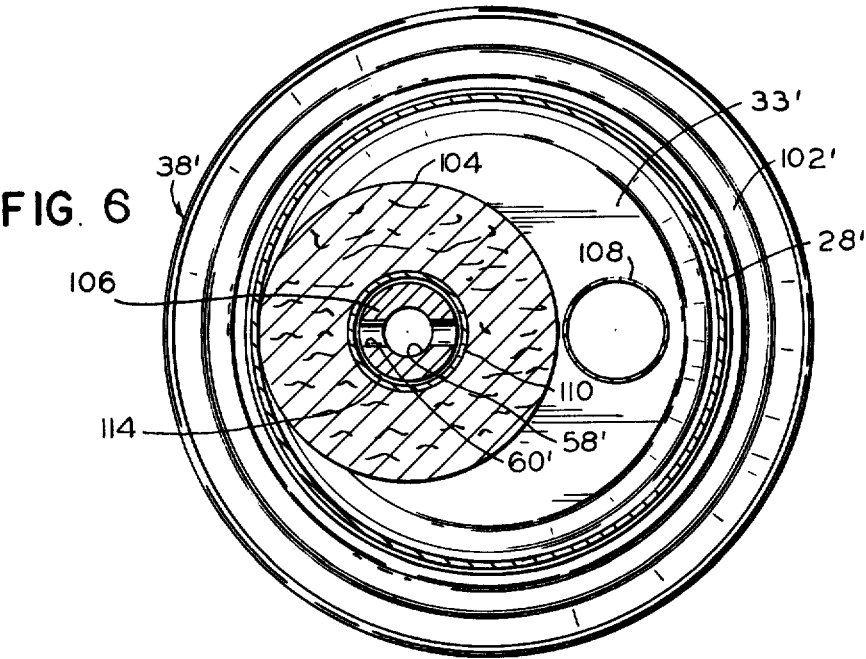
FIG. 6 is a horizontal cross section of the FIG. 5 filter taken at 6—6 in FIG. 5.

Referring now to FIGS. 5 and 6, illustrating an improved prefilter sump or first stage filter, generally indicated at 16, the construction is similar in many respects to the mating second stage filter 24. Can 28' encloses a filter media 104 wound on a tube 110 located around a vertical spindle 106, spindle 106 extending upwardly from manifold base 38' which is in turn secured to the bottom of the cabinet. However, the spindle 106 is off-center in the can whereby the media 104 clears a vertically upstanding inlet tube 108 press-fitted into manifold base 38' for communicating with passage 110 to which inlet line 14 may connect. The tube 108 extends through a substantially matching aperture in the underside of the can. It will be observed that the upward extension of pipe 108 places the inlet above the level of material which may collect in can 28', and also prevents undue backflow when the can is removed and replaced. The media 104 suitably comprises a nylon filament or cord of about 1/64 of an inch in diameter which is loosely spun to present a very fibrous or fuzzy surface, i.e., with a multiplicity of filaments extending radially outward therefrom. A filter of this general type is known as a Ful-flo filter of the honeycomb filter type manufactured by Commercial Filters Corporation, Lebanon, Ind. The particular filter herein described is more tightly wound at the interior, i.e., upon perforated center tube 110, to present orifices on the order of 100 microns in diameter. The cord is bobbin-wound, producing an overlapping weave having a diamond appearance, and which is looser or more open toward the outer periphery of media 104. The outside orifices are on the order of 3/16 square inch. A multiplicity of honeycomb pockets are provided which funnel to the tighter weave toward the center tube 110. Approximately 30 layers of cord are wound upon tube 110 between the inner and outer peripheries of the filter media.

As oil enters the prefilter sump 16 via tube 14, larger particles become entrained near the exterior of media 104 and splash or fall toward the bottom of the media and around tube 108 toward the bottom of can 28'.

Smaller particles pass into the honeycomb pockets in the media and become lodged in the pockets with the media removing particles larger than approximately 100 microns. The filtered oil with particles smaller than 100 microns passes through perforations 112 in tube 110 and into the region 114 between tube 110 and spindle 106. From there the oil with small particles passes through passages 60' into central passage 58' of spindle 106, communicating with threaded socket 52' and passage 116 for connection to line 18 leading to the pump. It will be observed that the pump thus draws the oil through the prefilter sump and toward the second stage filter 24 hereinbefore described. As in the case of the previously described filter, the spindle 106 has a lower threaded portion 50' threadably secured within threaded socket 52', and over which indented aperture 34' in the can bottom 33' is closely received. O-ring seal 68' seals the outlet connection so any oil escaping through aperture 34' will not leak therearound into the region where inlet oil may be present, nor can the inlet oil leak into the outlet oil passages. An O-ring seal 80', bearing against the downwardly beveled portion of the can bottom, prevents leakage of inlet oil to the outside environment. A well 102' is present for such slight leakage as may inadvertently occur when filter cans are exchanged.

The can top 44' is provided with an opening 42' through which threaded portion 40' of the spindle 106 extends. Also, a plate 86' having an aperture 92' is received upon threaded portion 40', with a knurled or irregular knob 94' threadably engaging threaded portion 40' for exerting downward pressure on plate 86'. Plate 86' has a lower groove 88' into which the upper can rim 90' is received, whereby hand torque applied to knob 94' is effective for urging the can downwardly and making an even, sealing connection between the can bottom and O-ring seals 68' and 80' on the manifold base, as well as making a sealing connection between O-ring seal 48' disposed upon upper shoulder 46' of spindle 106 and the underside of can top 44'.

As appears, this first stage filter or prefilter sump is also readily installed and exchanged in a simple manner without the requirement of tools and without requiring the undue soiling of hands by cooking personnel when the filter becomes clogged and apparent circulation becomes slowed with the pump bypass operating as described above. The filter media contained cans are simply exchanged.

Figure 7:
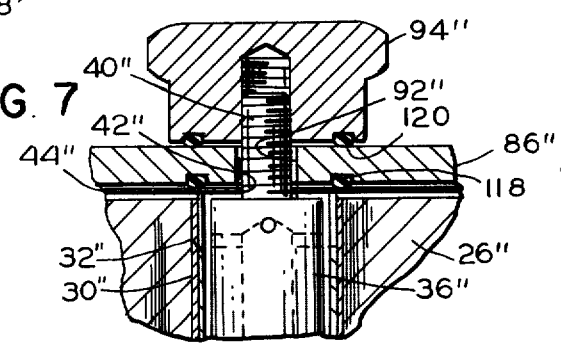
FIG. 7 is a partial vertical cross section of the filter of the present invention illustrating alternative sealing means.

While the foregoing sealing construction involving seals 48 and 48' respectively for bearing against the underside of can tops 44 and 44' is preferable from the standpoint of efficiency and economy, a second sealing construction has also been found efficacious as an alternative. This alternative is depicted in FIG. 7 and is particularly illustrated with respect to the second stage filter generally hereinbefore referred to employing reference numeral 24. Thus, a central spindle 36" is provided with an upper threaded portion 40" extending through opening 42" in can top 44" as well as through an opening 92" in plate 86". A hand-operated knob 94" threadably engages portion 40". However, instead of the O-ring seal being provided on the upper shoulder of spindle 36", an O-ring 118 is disposed on a grooved recess on the lower side of plate 86" for bearing against the can top 44". Moreover, another O-ring seal 120 is received in a lower groove in knob 94" and bears against the top of plate 86". Thus, when the knob 94" is drawn up by hand, any oil which may escape through opening 42" will be prevented from exiting in a radial direction by the O-ring seals 118 and 120.

Considering the general operation of the filtering system according to the present invention, heated cooking oil from a cooking vessel or the like is continuously circulated through prefilter sump 16, pump 20, and second stage filter 24 and returned to the cooking vessel, with the prefilter sump 16 removing food particles and the like down to about 100 microns before the hot cooking oil is drawn into pump 20. Pump 20 forces the oil up through spindle 36 and lengthwise, i.e., axially, from top to bottom through the filter media 26 of the second stage filter. In both the prefilter sump and in the second stage filter, the oil is passed through a configuration of interlocking fibers for removing undesired particles. The nylon thread of pre-filter sump 16 removes the undesired particles down to a predetermined size, while the interlocking fibers between sheets of the multilayer roll in the second stage filter 24 remove particles down to an extremely small size, the hot cooking oil as it passes downwardly in the second stage filter encountering an enormous number of such fibers. It has been found that filtering is sufficiently effective so that in some cases the cooking oil can be utilized for an extended period of time, far greater than heretofore thought possible.

It will be seen that the filtering system according to the present invention not only enhances the quality of filtering but also renders the changing of filter elements easily accomplished by hand. No tools are necessary, and cooking personnel can easily change filter elements by conveniently changing cylindrical cans without soiling hands or cooking surroundings. The cover 11 of cabinet 10 is raised, and the filtering apparatus is switched off electrically by means not shown. The hand-operated knobs are disengaged, and the cans are conveniently removed by hand and discarded after which replacement cans are installed within a relatively short time. The required pressure to prevent leaking is easily provided by hand without a complex or expensive mechanical structure. The sealing pressure is symmetrically applied with one hand adjustment.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In a filtering system for cooking oil, means for providing a disposable and replaceable filter unit readily engageable in sealing connection with said filtering system, said means comprising:

a manifold base adapted to receive said filtering unit in supporting relation and provided with separate connection means for supplying the entrance and exit of oil, said filtering unit comprising a cylindrical can having filtering media therein for filtering said oil by passage of said oil therethrough, said cylindrical can having a top and bottom joined to the cylindrical wall of said can, said top and said bottom are provided with substantially aligned apertures, said filtering media having a hollow core therethrough in alignment with said apertures, said core being a tube extending from the bottom to the top of said can, said tube having a plurality of openings therein constructed and arranged at the end of said tube adjacent the top of said can, the top of said filtering media being spaced from the underside of the top of the can to thereby define a space therebetween, an upstanding spindle joined to said manifold base and having a central passage communicating with one of said connection means in said manifold base, said spindle also having radial passage means communicating between said central passage and cooperating with said openings in said tube peripherally arranged around said spindle, said spindle being adapted to be received through said aligned apertures in said can, said radial passage means communicating radially outwardly through said openings in said tube into the said space defined by the underside of the top and the top of the filtering media, said can having one or more openings in the bottom outside said first of said aligned apertures for communicating with the other of said connection means in said manifold base, a substantially flat cover plate having an aperture therethrough, said spindle adapted and constructed to project upwardly through the aligned aperture in said top and through the aperture of said flat cover plate, knob means adapted and constructed to engage a portion of the spindle projecting through said flat cover plate, said knob means including means to draw said cover plate toward said spindle and said can whereby said cover plate forces downwardly said can to provide a sealing relation between the bottom of said can and the manifold base around said spindle and openings.

2. The apparatus according to claim 1 including sealing means for preventing escape of oil from said aligned apertures outside the area immediately surrounding said spindle, and for preventing escape of oil from said openings outside of the area of said can bottom as said can is forced downwardly.

3. The apparatus according to claim 1 including sealing means comprising O-ring seals surrounding said spindle on the top of said manifold base for engaging said bottom of said can, said other of said connection means communicating with said can between said O-ring seals.

4. The apparatus according to claim 3 wherein said manifold base is provided with a depression well between said O-ring seals communicating with said other of said connection means, said depression well extending around the top of said manifold base.

5. The apparatus according to claim 1 wherein the upper portion of said spindle is provided with a threaded extension positioned through the said aperture of said flat cover plate and wherein said knob means for drawing said cover plate toward said top of said can includes means for threadably engaging said extension and bearing against said cover plate.

6. The apparatus according to claim 1 wherein said cover plate is provided with a circular groove on the underside thereof for receiving the rim of said can, for centering said can and forcing said can downwardly along the cylindrical wall thereof.

7. The apparatus according to claim 6 wherein said manifold base is provided with a beveled wall for engaging the inside rim of the bottom of said can and cooperating in providing the centering of said can as said can is forced downwardly.

8. The apparatus according to claim 1 wherein said filtering media comprises a multilayer roll of thin, fibrous paper material presenting interlocking fibers between layers.

9. The apparatus according to claim 1 including further sealing means comprising an O-ring seal between an upper shoulder of said spindle and the top inside of said can.

10. The apparatus according to claim 1 including further sealing means comprising a first O-ring seal between the bottom of said cover plate and the top of said can, and a second O-ring seal between said means for drawing said cover plate toward said spindle and said cover plate.

11. The apparatus according to claim 1 wherein a portion of said can top is located between said spindle and said cover plate, with sealing means bearing against the top of said can proximate the top of said spindle.

12. In a filtering system for cooking oil, means for providing a disposable and replaceable filter unit readily engageable in sealing connection with said filtering system, said means comprising:

a manifold base adapted to receive said filtering unit in supporting relation and provided with separate connection means for supplying the entrance and exit of oil, said filtering unit comprising a cylindrical can having filtering media therein for filtering said oil by passage of said oil therethrough, said cylindrical can having a top and bottom joined to the cylindrical wall of said can, wherein said top and said bottom are provided with substantially aligned apertures, an upstanding spindle joined to said manifold base and having a central passage communicating with one of said connection means in said manifold base, said spindle also having radial passage means communicating between said central passage and the surface of said spindle at one or more locations upwardly from said manifold base, said spindle being adapted to be received through said aligned apertures in said can, said radial passage means communicating radially outwardly into the filtering media in said can within the axial dimension of said can between said apertures in the top and bottom of said can with said can in position upon said manifold base, said can having another opening in the bottom of said can outside said first of said aligned apertures, said other of said connection means being provided with an upstanding tube extending through said other opening between said media and the side of said can, said media and said spindle being off-center with respect to the axis of said can, a substantially flat cover plate having an aperture therethrough, said spindle adapted and constructed to project upwardly through the aligned aperture in said top and through the aperture of said flat cover plate, knob means adapted and constructed to engage a portion of the spindle projecting through said flat cover plate, said knob means including means to draw said cover plate toward said spindle and said can whereby said cover plate forces downwardly said can to provide a sealing relation between the bottom of said can and the manifold base around said spindle and openings.

13. The apparatus according to claim 12 wherein said media comprises cord characterized by a fibrous exterior, said cord being wound in an overlapping weave which becomes a tighter weave in a direction taken by said cooking oil in passing through said filter media, to provide a plurality of pocket-like semi-enclosures for trapping particles from said cooking oil, said last mentioned media being wound on a perforate tube within said can and enclosing said spindle, said radial passage means in said spindle extending outwardly from said central passage for receiving oil from the last mentioned media through said perforations.

14. The apparatus according to claim 12, including a first O-ring seal on the top of said manifold base and around said spindle for bearing against the bottom of said can, and a second O-ring seal on the top of said manifold base around the first O-ring seal and around said upstanding tube for also bearing against the bottom of said can.

* * * * *